United States Patent [19]

Barnes

[11] 4,436,433

[45] Mar. 13, 1984

[54] BLENDING OF FLUID MATERIALS

[75] Inventor: George D. Barnes, Camberley, England

[73] Assignee: Wilkinson Rubber Linatex Limited, Great Britain

[21] Appl. No.: 345,407

[22] Filed: Feb. 3, 1982

[30] Foreign Application Priority Data

Feb. 9, 1981 [GB] United Kingdom ................ 8103909

[51] Int. Cl.³ ............................................ G05D 11/02

[52] U.S. Cl. ........................................ 366/152; 209/10

[58] Field of Search ................................ 209/158–161, 209/208, 491, 496, 1, 10, 235, 236, 239; 366/17, 16, 37, 30, 152; 364/502

[56] References Cited

U.S. PATENT DOCUMENTS

| | | | |
|---|---|---|---|
| 3,182,969 | 5/1965 | Rupp | 259/25 |
| 3,295,677 | 1/1967 | Londolios | 209/158 X |
| 3,379,421 | 4/1968 | Putman | 366/17 |
| 4,032,436 | 6/1977 | Johnson | 209/1 |
| 4,282,088 | 8/1981 | Ennis | 209/496 X |

FOREIGN PATENT DOCUMENTS

| | | | |
|---|---|---|---|
| 2139349 | 2/1973 | Fed. Rep. of Germany . | |
| 2243298 | 3/1973 | Fed. Rep. of Germany . | |
| 2428069 | 1/1976 | Fed. Rep. of Germany . | |
| 1303067 | 1/1973 | United Kingdom | 209/158 |
| 2033110 | 5/1980 | United Kingdom | 209/10 |

OTHER PUBLICATIONS

"Method for Controlling Coffee Density", Research Disclosure, No. 201, Jan. 1981.

*Primary Examiner*—Frank W. Lutter
*Assistant Examiner*—William J. Bond
*Attorney, Agent, or Firm*—Spensley, Horn, Jubas & Lubitz

[57] ABSTRACT

Particulate material such as sand is classified in two or more classifying devices (13 and 15) which operate on the principle of "hindered settling" each to provide a coarse underflow fraction and a fine overflow fraction. A chosen blend 12 of the underflow fractions is provided by pneumatic control circuitry (FIGS. 2,5,6) which actuates flow control valves (14 and 16) to open, by amounts in accordance with a chosen blend ratio, only when there is sufficient material available for blending.

20 Claims, 9 Drawing Figures

BLENDING OF FLUID MATERIALS

BACKGROUND OF THE INVENTION

This invention relates to blending of fluid materials, especially particulate material, and more particularly, but not exclusively, is concerned with apparatus to control blending of two or more homogeneous, particulate materials automatically to obtain a predetermined volumetric blending ratio of the constituent materials in the blended product.

It is known to the assignee of the instant application to provide apparatus for treating a particulate material, the constituent particles of which are non-uniform size, in order to obtain at least one product which meets a desired particulate specification the apparatus comprising a classifier which separates the particulate material into a relatively coarse underflow fraction and a relatively fine overflow fraction, and which has control means for varying as required the flow of the underflow fraction from the classifier.

The assignee of the instant application makes and sells in U.K. such an apparatus, under the product name "T-type Classifier". The principle on which this classifier functions is one of "hindered settling" and the construction of the apparatus is such that the rate at which underflow fraction is removed can be continuously varied to some extent while it is in operation without affecting the particulate specification of the underflow.

It is sometimes useful to blend together two or more products of different particulate specification in order to achieve a product specification demanded by a customer. One way of achieving such a blend would be to store in bins two or more different output fractions from classifiers and then draw from the bins whatever relative weights of material are required for the blend. However, it is one disadvantage of this technique that the bins are expensive and take up valuable space.

Where more than two constituent materials are to be blended, it is undesirable for blending to continue in the event that one of the constituent flows falls below a minimum flow required for blending. The resultant combination of the other constituent flows is unlikely to meet a specification and may be of little or no value in consequence. Thus, it would be a desirable feature of any blending apparatus to be able to halt all combining the constituent flows should any one flow become deficient. It would be particularly advantageous if the particulate specifications of the constituent flows could themselves be adjusted so that each is a saleable commodity in itself.

SUMMARY OF THE INVENTION

The present invention represents an attempt to ameliorate the above-mentioned disadvantages.

Thus, in accordance with the present invention, the apparatus comprises at least a first and a second one of said classifier, the said first classifier having a first control means for varying as required the flow of a first underflow fraction from the said first classifier and the said second classifier having a second control means for varying as required the flow of a second underflow fraction from the said second classifier, and further comprises means for blending the consequent first and second underflow fractions including means for controlling the first and second control means so as to maintain during blending a chosen blend ratio between the rate of flow of the first underflow fraction and the rate of flow of the second underflow fraction, and means for dumping such underflow fraction as is surplus to blending requirements.

According to another aspect of the present invention there is provided apparatus to control blending of supplies of at least a first and a second fluid material comprising (1) at least a first flow control valve actuable by a first valve signal to control a flow of said first material and a second flow control valve actuable by a second valve signal to control a flow of said second material, (2) ratio-setting means to secure a chosen ratio between a rate of flow of the first fluid material through the first valve and a rate of flow of the second fluid material through the second valve and so obtain a desired blend of material upon mixing the said flows downstream of said valves, and (3) check means to sense periods of time when one or more of the said supplies is not adequate for obtaining the desired blend and halt blending until the supplies are adequate.

An important application of the invention is in the blending of sands. In this application, some or all of the supplies of sand for blending may be derived from sand classifiers. A suitable classifier for this purpose is the present applicant's own "T"-type classifier.

BRIEF DESCRIPTION OF THE DRAWING

For a better understanding of the invention, and to show more clearly how the same may be carried into effect, reference will now be made, by way of example, to the accompanying drawings in which.

DESCRIPTION OF THE PREFERRED EMBODIMENTS

Figure 1:
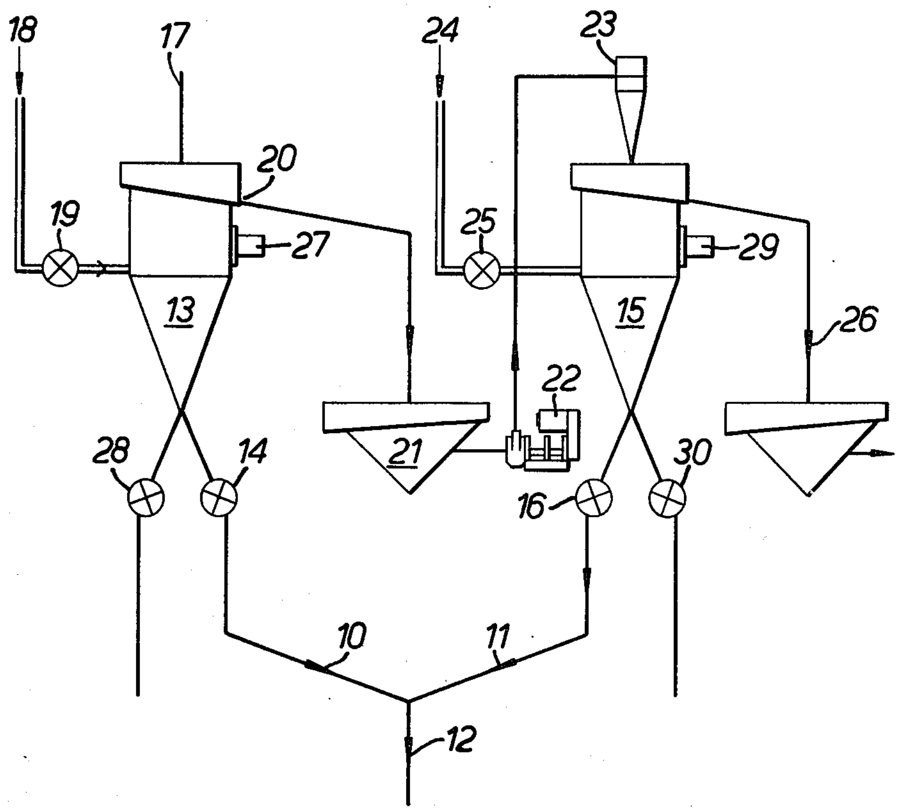
FIG. 1 is a block diagram of a blending plant.

FIG. 1 shows apparatus for blending a coarse sand fraction 10 with a fine sand fraction 11 to produce a blended sand product 12. Supply of the coarse sand fraction 10 is as underflow from a first Wilkinson T-type classifier 13 via a first Wilkinson flow control valve 14. The fine sand fraction 11 is supplied as underflow from a second T-type classifier 15 via a second flow control valve 16.

The blended sand product 12 is obtained from a single feed stock supply 17 which is fed to the first classifier 13. The classifier functions conventionally, with a flow of water 18 controlled by a water-control valve 19 providing an up-current within the classifier 13 which separates the feed 17 on the principle of "hindered settling" into a coarse underflow fraction which settles in the conical base of the classifier to be discharged through the flow control valve 14 and a less coarse overflow fraction which is discharged from the classifier 13 at an overflow 20.

The less coarse overflow fraction flows from the overflow 20 through a feed-regulating sump 21, a pump 22, a water-removing, sand-water separator 23 and thence to the second classifier 15. A further supply 24 of up-current water, controlled by a second water control valve 25, provides an up-current within the second classifier 15 so as again to provide an intermediate relatively coarse underflow fraction (although finer than the previously mentioned coarse underflow fraction) which settles within the conical lower part of the classifier 15 to be discharged through the flow control valve 16 and a fine fraction discharged from the overflow 26 of the classifier 15. The fine fraction from the classifier 15 played no further part in the illustrated blending process.

Figure 2:
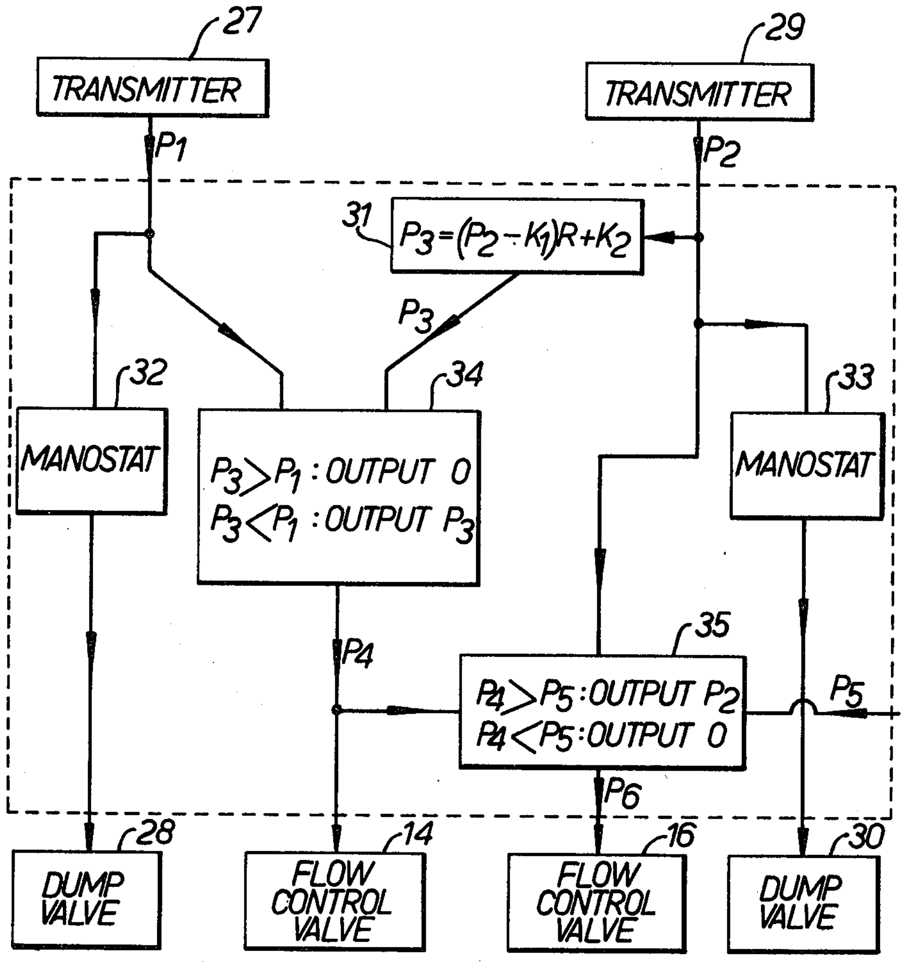
FIG. 2 is a block diagram of a first embodiment of apparatus to control blending in the plant.

Referring to FIGS. 1 and 2, the first classifier 13 is provided (as it is conventional) with a first pressure sensor and transmitter both elements being identified by designation line 27 in FIGS. 1 and 2. Classifier 13, in combination with the first pressure sensor transmitter 27, generate a pneumatic signal $P_1$ in a range of from 0.21 bar (3 psi) to 1.03 bars (15 psi) indicative of the quantity of dense sand fraction contained within the classifier 13. One suitable sensor is made in Italy by OBSA and is available from Drayton Controls (Engineering) Limited of West Drayton, County of Middlesex, England. At the base of the classifier 13 is a first Wilkinson dump valve 28 which can be actuated to discharge the coarse underflow fraction from the classifier whenever the quantity of this coarse fraction contained within the classifier body exceeds a prescribed maximum level. Similarly, the second classifier 15 has a second pressure sensor and transmitter 29 and a Wilkinson dump valve 30.

Turning now to FIG. 2, a signal $P_2$ from the second sensor and transmitter, both elements being identified by element 29. This signal is fed, not only to the second flow control valve 16, but to an adjustable ratio relay generally indicated by element 31. This relay is a pneumatic instrument which provides an output signal $P_3$ to the first flow control valve 14 which is related to the input signal $P_2$ according to the expression $P_3=(P_2-K_1)R+K_2$ where R is a ratio setting, $K_1$ is an input bias pressure and $K_2$ is an output bias pressure. Suitable relays are made by Fairchild Corporation of Winston-Salem NC 27105, U.S.A. and by Negretti and Zambra Ltd. of Aylesbury, County of Buckinghamshire, England. Conveniently $K_1$ and $K_2$ are both set at 0.21 bar (3 psi). The flow control valves 14 and 16 are so constructed and arranged that there is a linear relationship between the variation of pneumatic signal pressure in the range of 0.21 to 1.03 bars which actuates them and the open area of the flow passage within the valve. Consequently, the setting ratio R effectively determines the volumetric blending ratio of the materials flowing through the valves 14 and 16. Where a blend ratio of the order of 1:1 is required, the valves 14 and 16 can be of equal size. Where blend ratios of 2:1 or the like are required greater efficiency will usually be achieved by replacing valves of equal size by valves of different size. Flow control elements 14 and 16, while preferrably valves, can also be conventional flow control pumps.

As explained below, other components of the pneumatic control circuit shown in FIG. 2 serve to ensure that blending takes place only when the supplies of constituent materials are adequate for the purpose. In addition, a first manostat 32 which is a snapacting relay with a manual set point is responsive to the signal pressure $P_1$ and is triggered by pressures in excess of 15 psi. It opens the dump valve 28 when $P_1$ rises above 1.03 bars and closes the dump valve 28 as soon as $P_1$ falls below 1.03 bars. This ensures that an excess of underflow fraction within the classifier 13 does not develop.

Likewise, an excess of the underflow fraction in the second classifier 15 is prevented from developing by the presence of a second manostat 33 which actuates the dump valve 30 in like manner.

A first signal comparison device 34, which is a double-diaphragm spool valve, compares signals $P_1$ and $P_3$ and provides a non-zero output $P_4$ which varies with input $P_3$ when $P_1$ is greater than $P_3$ i.e. when there is sufficient material for blending in the first classifier 13, but is otherwise zero. The spool valve can be switched by a differential pressure of 0.035 bar, when both sides of both diaphragms are used. If desired, means to amplify the signals by 10:1 could be provided upstream of the comparison device, so as to enable the device 34 to switch at differential signal pressures as low as 0.0035 bar.

The output $P_4$ from the comparison device 34 provides an actuating signal to the first control valve 14 and a first input to a second signal comparison device 35, to which signal $P_2$ is provided as a second input. The device 35 compares signal $P_4$ with a threshold pressure reference signal $P_5$ provided by a precision regulator and generates a non-zero output $P_6$ which is proportional to input $P_2$ only when $P_4$ is greater than $P_5$. In the illustrated device, $P_5$ is set at 0.315 bar (4.5 psi). The device 35 therefore assesses whether there is sufficient material for blending in both the first classifier 13 and the second classifier 15 and opens the second flow control valve 16 when there is. Signal $P_4$ which actuates the first valve 14 is non-zero only when $P_2>K_1$. Thus the valve 14 will open only when there is material available for blending in both the classifiers 13 and 15. In practice, the valve 14 is set in such a way that it is not actuated until $P_4$ exceeds 0.315 bar.

Figure 3:
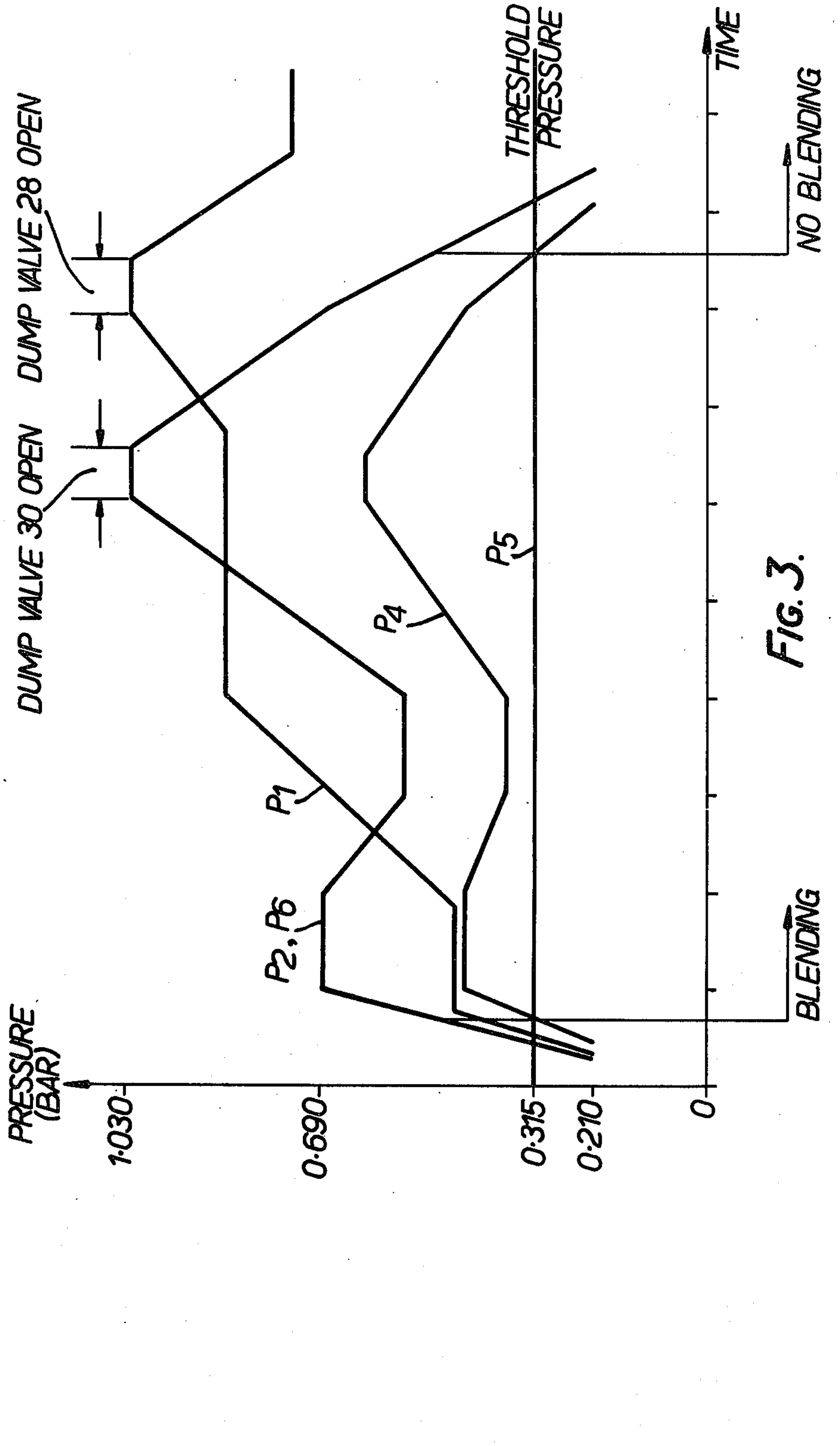
FIGS. 3 and 4 are graphs representing a variation with time of certain pneumatic pressures within the control apparatus.

From FIG. 3, it will be seen that blending begins when $P_4$ first becomes greater than the threshold pressure $P_5$. At that instant, $P_6$ becomes finite and both the first control valve 14 and the second control valve 16 are open, their apertures varying in proportion according to a chosen blend ratio R. Blending ceases when $P_4$ falls beneath $P_5$. In the case illustrated, R is 2:1 i.e. a blend with 2 parts by volume through the valve 14 to 1 part by volume through the valve 16. $K_1$ and $K_2$ are both 0.21 bar. Should $P_1$ or $P_2$ attain a value of 1.03 bars (15 psi) then the relevant dump valve opens to ensure that there is no further increase in pressure. Once the pressure begins to fall from 1.03 bars the dump valve closes.

Figure 4:
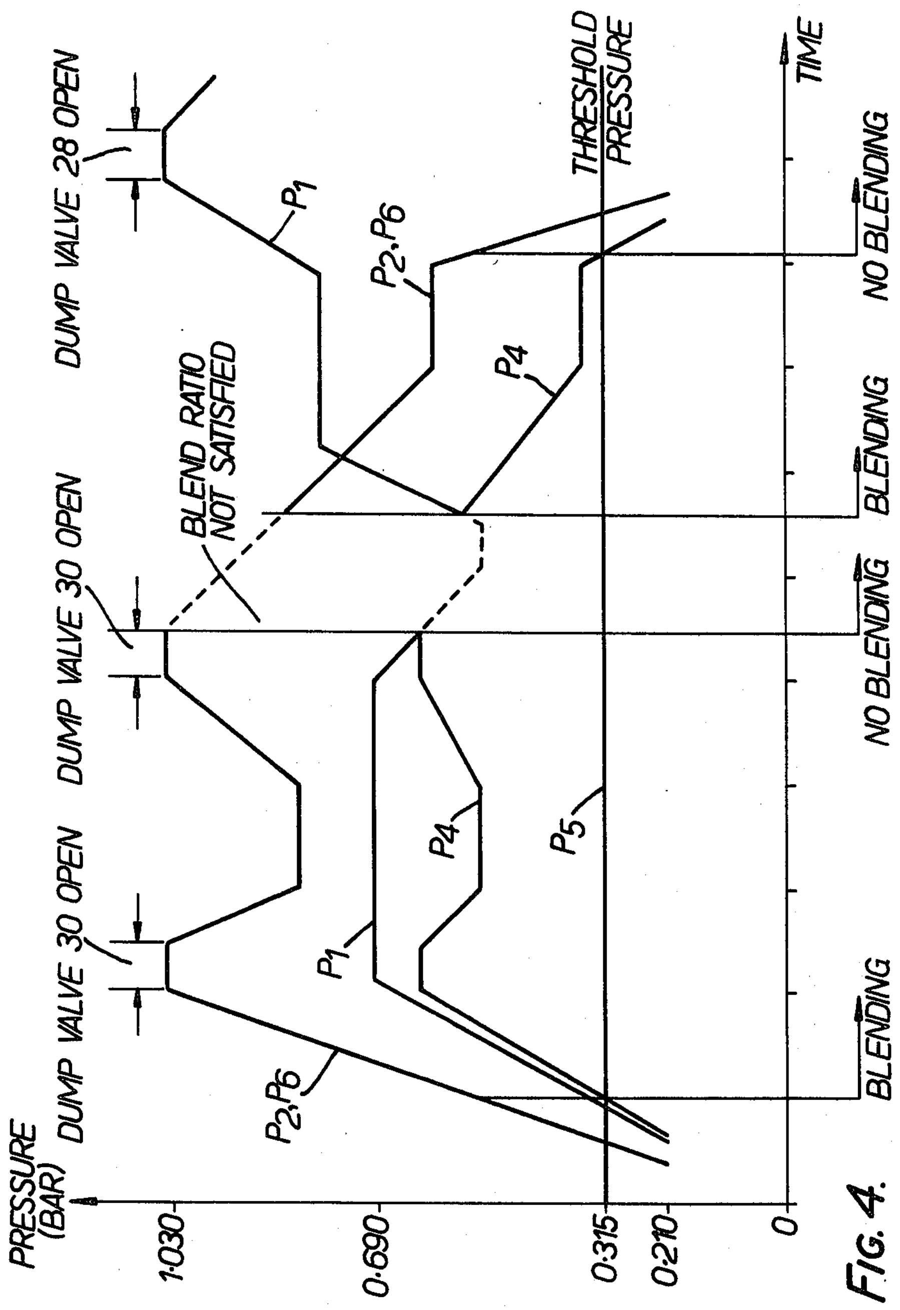

FIG. 4 illustrates a period in which the quantity of material in the first classifier 13 falls to a low level so that $P_1$ drops to a value no greater than the output signal from the adjustable ratio device 31. At the instant this occurs, the output from the signal comparison device 33 falls to zero so that the first flow control valve 14 closes and the second comparison device 35 is actuated to bring to zero the actuating signal $P_6$ for the second control valve 16. With both control valves 14 and 16 closed there is no blending until the quantity of material in the first classifier 13 becomes sufficiently great to generate a signal $P_1$ in excess of $P_3$.

Figure 5:
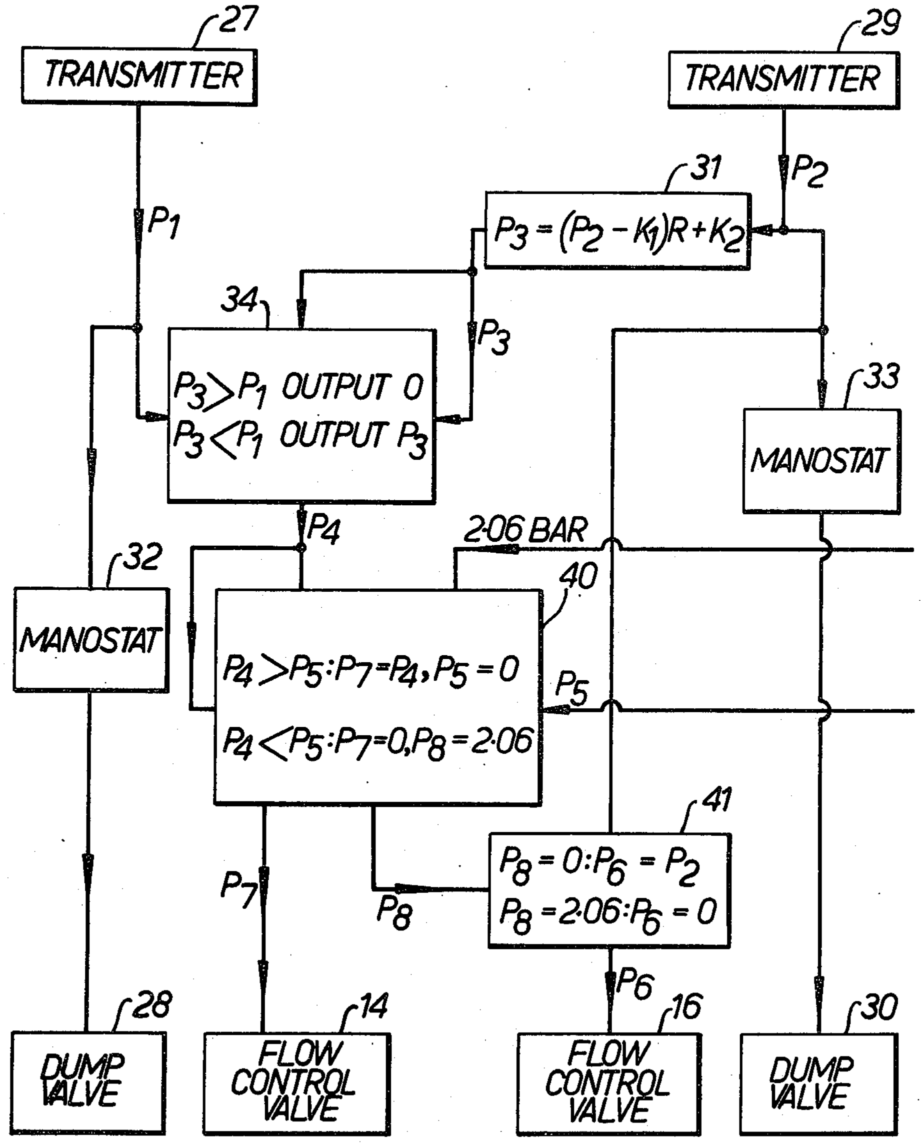
FIG. 5 is a block diagram of a second embodiment of apparatus to control blending in the plant.

In the apparatus shown in FIG. 5, most of the components are analogous to those shown in FIG. 2 and are identified by like reference numerals. The first signal comparison device 34 is provided by a so-called "3 port" valve. The second signal comparison device 35 is replaced by a somewhat more sophisticated comparison device 40 and an air/spring valve 41 actuated by a signal from the comparison device 40. When the valve 41 is subject to an input signal $P_8$ of 2.06 bar it isolates the second flow control 16 from the signal $P_2$ from the second transmitter 29. When $P_8$ is zero the valve 41 is open. The signal comprison device 40 functions as follows: when $P_4 \geqq P_5$ then $P_7 = P_4$ and $P_8 = 0$; when $P_4 < P_5$ then $P_7 = 0$ and $P_8 = 2.06$ bar. Thus, the first and second flow control valves 14 and 16 are closed whenever $P_4$ falls below the reference pressure $P_5$.

Figure 6:
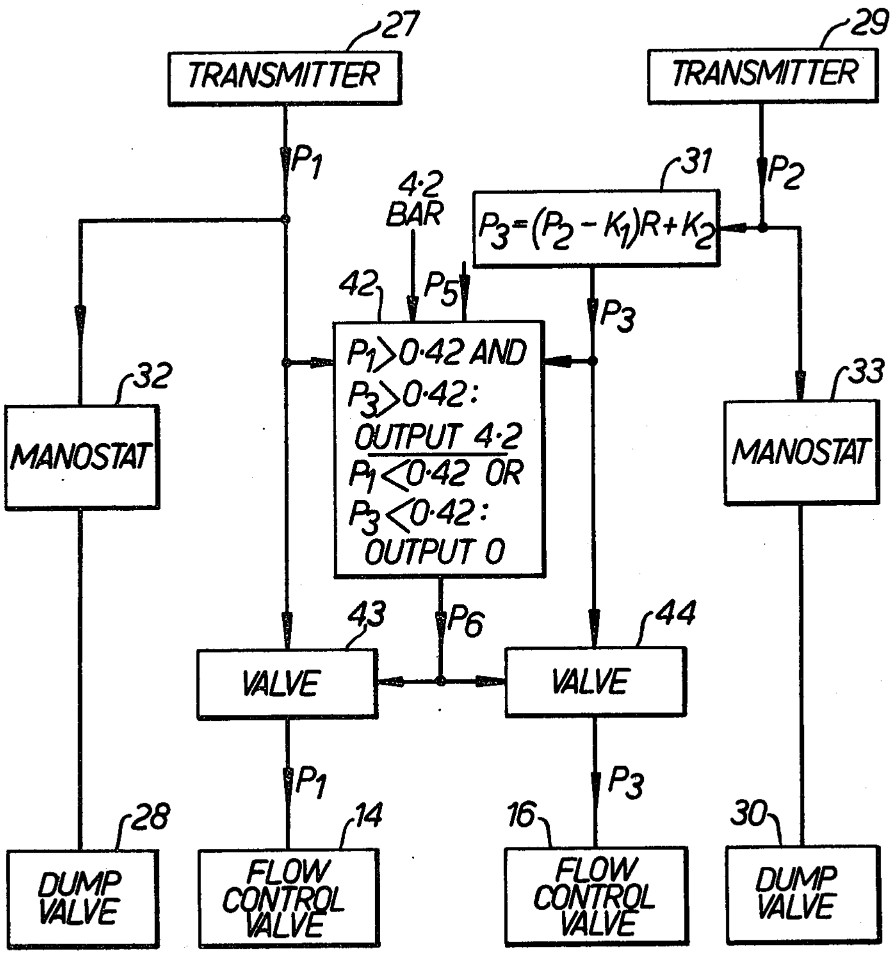
FIG. 6 is a block diagram of a third, and presently most preferred, embodiment of apparatus to control blending in the plant.

In FIG. 6, the datum pressure $P_5$ for the flow control valves 14 and 16 is set at 0.42 bar (16 psi). This signal level determines a minimum at which the valves will discharge to blend. In this embodiment, a signal comparison device 42 compares $P_1$ and $P_3$ with $P_5$. If both $P_1$ and $P_2$ exceed $P_5$ there is an output $P_6$ of supply pressure 4.2 bar from the comparison device 42 to pilot-operated valves 43 and 44. The valves 43 and 44 are normally closed by spring, but application to them of pressure $P_6$ opens them to allow pressures $P_1$ and $P_3$ respectively to open the flow control valves 14 and 16 respectively and produce a blend. If either $P_1$ or $P_3$ is below 0.42 bar comparison device 42 is not actuated and valves 43 and 44 will remain closed. The signal comparison device 42 incorporates a time delay so that any hunting in pressures $P_1$ and $P_3$ will not be transmitted to the actuation of the valves 43 and 44.

Figure 7:
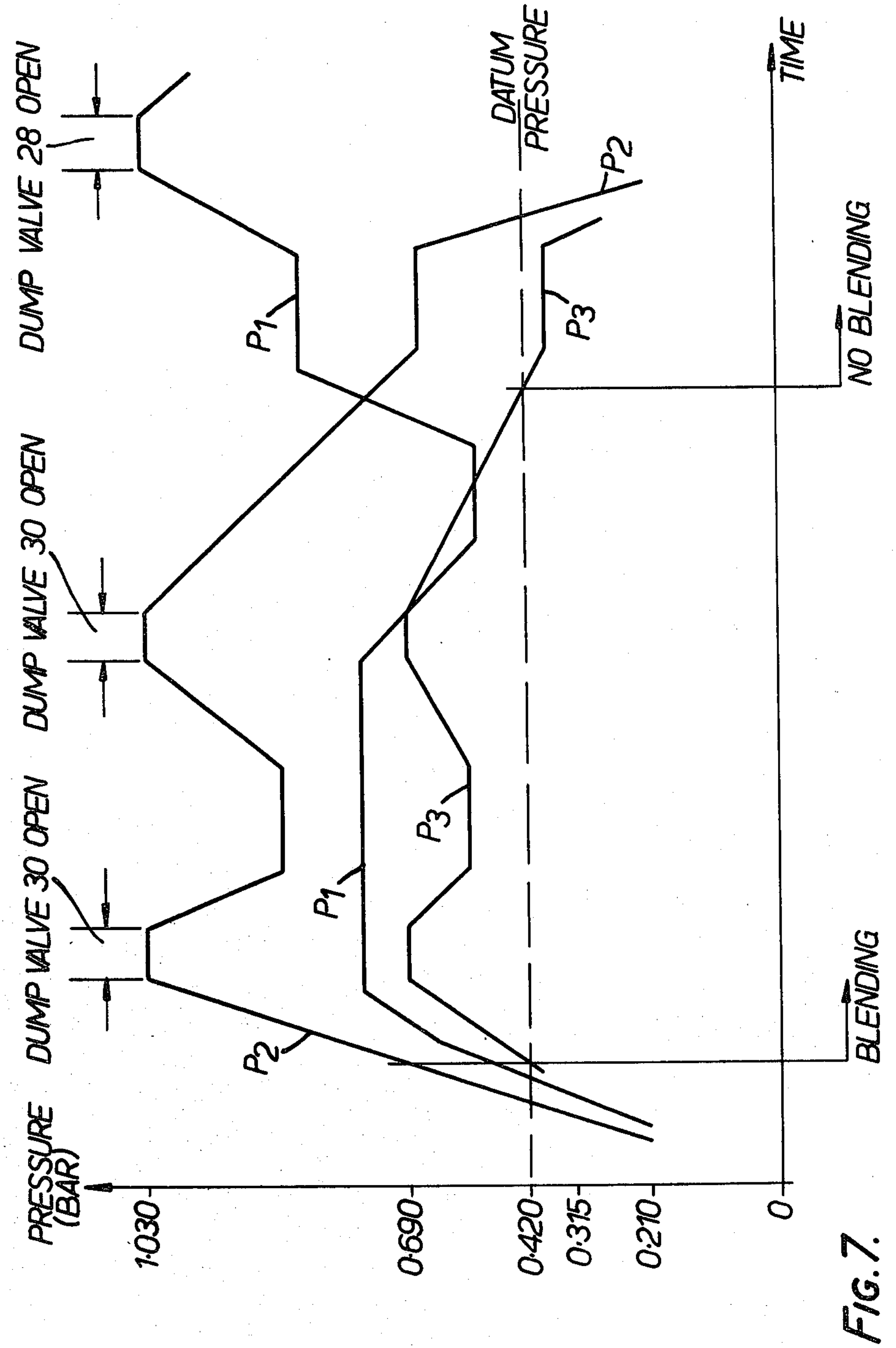
FIGS. 7 and 8 are graphs representing a variation with time of certain pneumatic pressures within the control apparatus.
Figure 8:
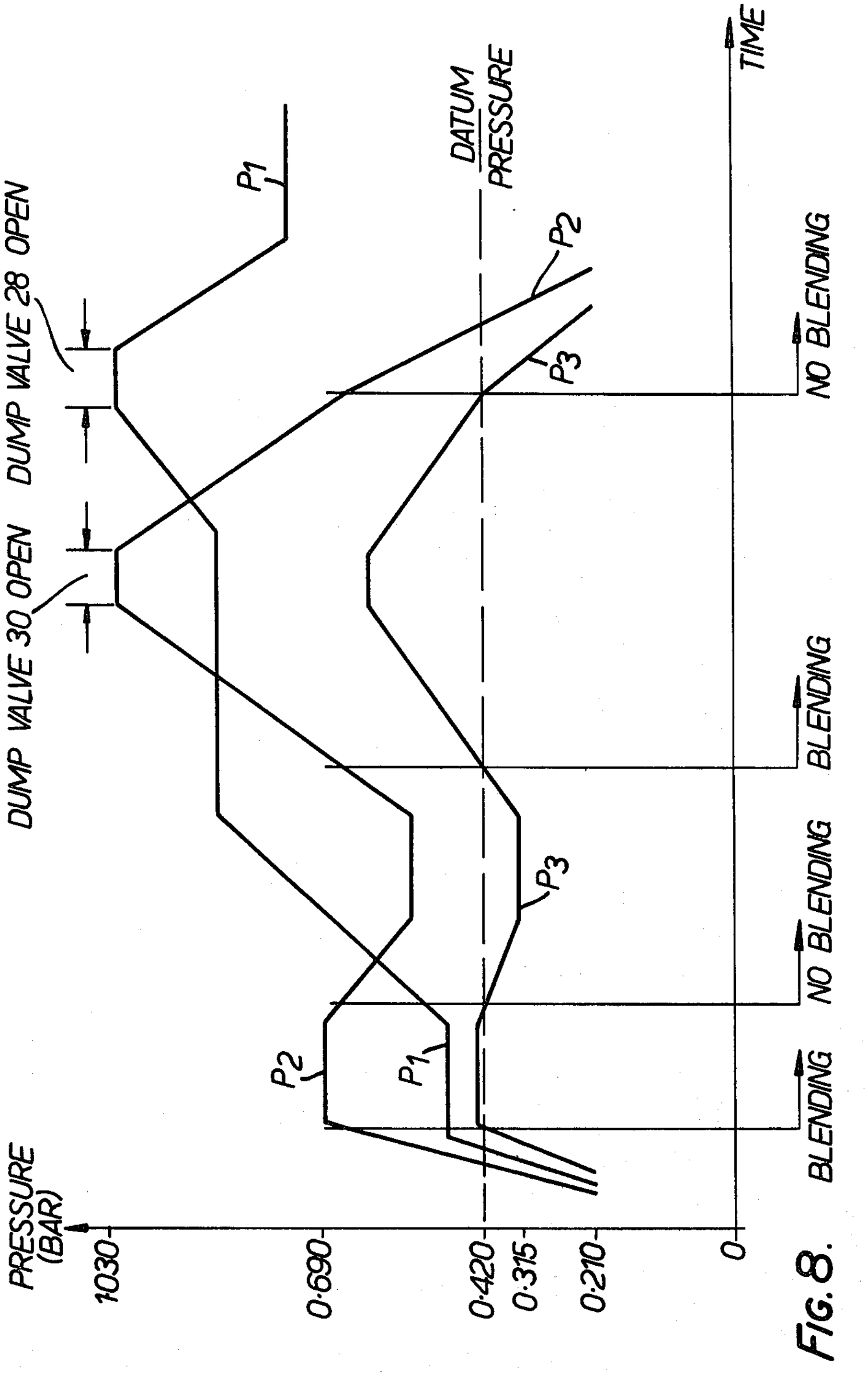

In FIGS. 7 and 8 a blend ratio, as in FIGS. 3 and 4, of 2 parts by volume through the valve 14 to one part through valve 16 is fixed by the ratio setter 31, and $K_1$ and $K_2$ are both fixed at 0.21 bar. Thus, when $P_2$ reaches 0.63 bar $P_3$ reaches 0.42 bar so that, with $P_1 > 0.42$ bar, blending commences.

In FIGS. 7 and 8, the effect is seen of a drop to a value less than $P_3$ in output signal $P_1$ from the transmitter 27. In this case, blending continues as long as both of the pressures $P_4$ and $P_1$ are above the threshold pressure $P_5$ but when $P_3$ falls below $P_5$ then blending is halted by closure of both of valves 14 and 16.

The granulometric specification of the blended product varies with the blend ratio R, the rate of flow of up-current water to the first classifier 13 (which may be controlled by the valve 19) and the rate of flow of up-current water to the second classifier 15 (which may be controlled by the control valve 25). It may be convenient to record the settings of these three parameters which are required for any particular blend specification and to the provide a device for reading the recorded specification and setting the parameters as required.

Figure 9:
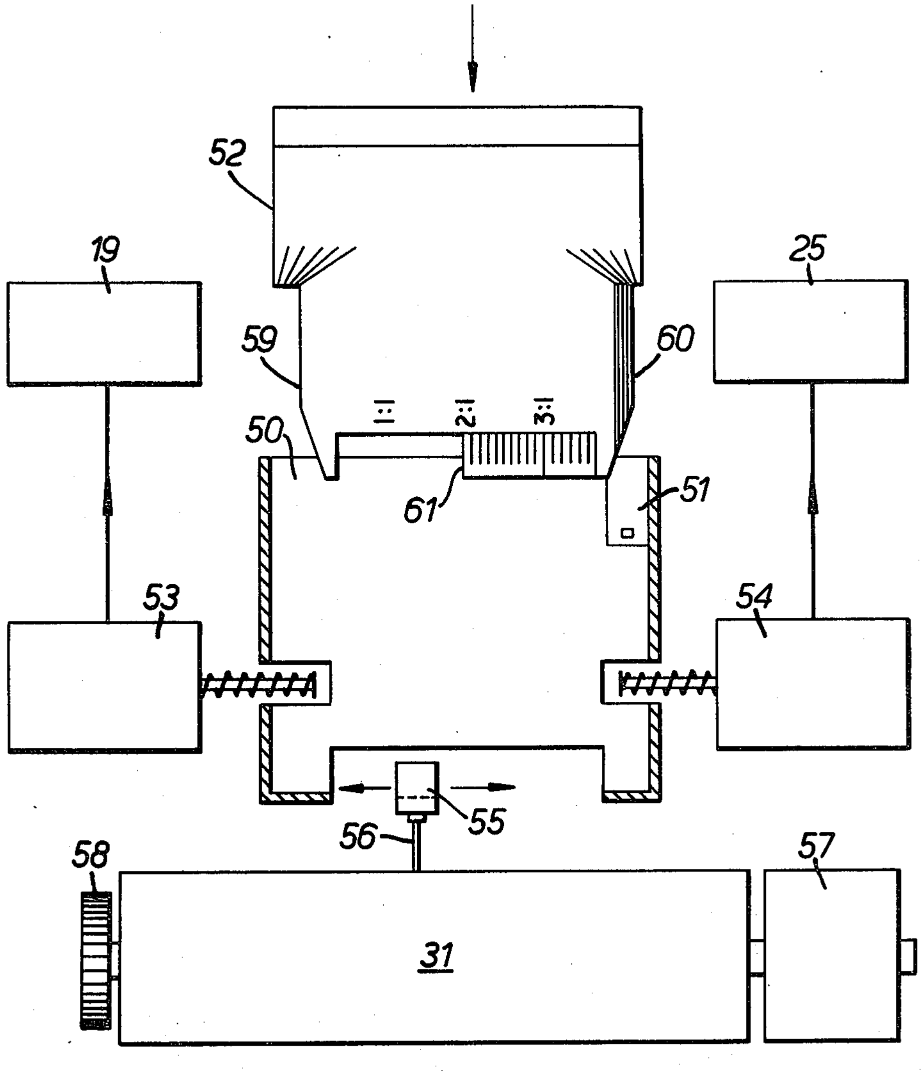
FIG. 9 is a diagrammatic view of a card-reading device showing schematically one way in which a predetermined blend ratio could be procured.

For example, each one of a number of desired blend specifications can be recorded on individual cards which can be inserted as desired into a card reader which sets the valves 19 and 25 and the blend ratio R as required. FIG. 9 shows one possible arrangement of card and card reader.

The card reader comprises a card holder 50 having a micro-switch 51 for detecting the presence of a card 52 within the holder. Within the holder 50 is a first positioner 53 and a second positioner 54 each of which provides as output a pneumatic signal in a range of from 0.21 to 1.03 bars. The signal from the first positioner 53 actuates the valve 19 and the signal from the second positioner 54 actuates the valve 25. The holder 50 also has an air sensor 55 which detects the presence of an edge of a card inserted in the holder 50.

The ratio-setting relay 31 has an arm 56 which moves in accordance with the ratio set by the relay. The sensor 55 is mounted on the arm 56. A pneumatic motor 57 drives the relay 31 through the range of ratios which it permits unit further drive is terminated by the sensing of a card edge by the air sensor 55. The relay 31 also has a manually operated ratio-setting knob 58.

Thus, the card 52 will have a first cut-away side edge 59 contacted by the first positioner 53 to fix the setting of the valve 19, a second cut-away side edge 60 contacted by the second positioner 54 to fix the setting of the valve 25, and a cut out portion in the bottom edge of the card to fix the ratio at a card edge 61.

The card reading device operates as follows:

CARD INSERTED

1. Microswitch 51 detects card 52.
2. Air supply to reading system switched on.
3. Air motor 57 advances ratio setting, advances mechanically-linked air sensor 55 along ratio range from lower end thereof.
4. Air sensor 55 reads card 52, shuts off air motor when correct ratio (at edge 61) achieved.
5. Positioners 53 and 54 read card 52, produce control signals to set water up-current control valves 19 and 25.
6. Pneumatic signal indicates "Parameters Set". Blending system activated. Air supply to reading system switched off.

CARD REMOVED

1. Microswitch 51 detects absence of card 52.
2. "Parameters Set" signal cancelled. Blending stops, air supply to reading system switched on.
3. Air motor 57 decreases ratio setting.
4. Air sensor 55 reads card 52, shuts off air motor 27 when 'Park' position achieved
5. Up-current control valves 19 and 25 shut off.
6. Air supply to reading system switched off.

The illustrated embodiment is for blending merely a first and a second fraction to produce a blended product. It provides the basis for a means of preparing a blended product from a plurality of constituent fractions.

The aforementioned manostat and signal comparison devices were obtained from Crouzet S.A. BP1014, 26010 Valences CEDEX, France.

The present invention also includes a method of treating a particulate material, such as may be performed by use of the above-described apparatus. The operating parameters of the classifiers can be so set that, besides the blend, each of the individual underflow fractions is a saleable product.

I claim:

1. Apparatus for treating a particulate material, the constituent particles of which are of non-uniform size, in order to obtain at least one product which meets a desired particulate specification, the apparatus comprising a classifier which separates the partculate material into a relatively coarse underflow fraction and a relatively fine overflow fraction, and which has control means for varying as required the flow of the underflow fraction from the classifier, the apparatus further comprises at least a first and a second one of said classifier, the said first classifier having a first control means for varying as required the flow of a first underflow fraction from the said first classifer and the second classifier having a second control means for varying as required the flow of a second underflow fraction from the said second classifier, means for blending the consequent first and second underflow fractions including means for controlling the first and second control means so as to maintain during blending a chosen blend ratio between the rate of flow of the first underflow fraction and the rate of flow of the second underflow fraction, and means for dumping such underflow fraction as is surplus to blending requirements.

2. Apparatus as claimed in claim 1 wherein the first and second control means are pumps.

3. Apparatus as claimed in claim 1 wherein the first and second control means are valves.

4. Apparatus as claimed in claim 1, wherein at least one of the classifiers is an elutriator.

5. Apparatus as claimed in claim 1, wherein at least one of the classifiers is arranged to operate on the principle of hindered settling.

6. Apparatus as claimed in claim 5, wherein each of the classifiers has a sensor which provides a signal indicative of the quantity of underflow fraction within the classifier.

7. Apparatus as claimed in claim 6, wherein each classifier has a said dump means for releasing a surplus of underflow fraction from the said classifier, the dump means being actuated when the signal from the sensor of one of the said classifiers-passes a specified critical upper value.

8. Apparatus as claimed in claim 6, wherein the said first and second control means are actuated by a signal from at least one of said sensors.

9. Apparatus as claimed in claim 8, further including a blend ratio-defining device which operates on the signal from one said sensor on one said classifier, the signal issuing from the said one sensor being passed to one of the first control means and the second control means and a signal issuing from the ratio-defining device being passed to the other control means whereby the rates of flow of material past the respective control means are in accordance with the defined blend ratio.

10. Apparatus as claimed in claim 9, wherein the ratio-defining device is adjustable to provide a predetermined ratio within a range of available blend ratios.

11. Apparatus as claimed in claim 6, further including means for sensing when the content of underflow fraction in any classifier is insufficient to permit proper operation of the classifier and to bring to zero or substantially zero the flow of underflow fraction through both the first and the second control means thereby to halt blending until the insufficiency is eliminated.

12. Apparatus as claimed in claim 11 wherein said means for sensing is provided by the aforementioned sensor, an insufficiency being indicated by passage of a signal from the sensor through a specified critical lower value.

13. Apparatus as claimed in claim 1, wherein the classifiers are arranged in series, with the second classifier receiving as input the overflow fraction from the first classifier.

14. Apparatus as claimed in claim 13, further including a feed-regulating sump, a pump and a dewatering device, and wherein the overflow fraction from the first classifier is passed to the feed-regulating sump, from the sump to the pump, from the pump to the de-watering device, and from the de-watering device to the said second classifier.

15. Apparatus to control blending of supplies of at least a first and a second fluid material comprising (1) at least a first flow control valve actuable by a first valve signal for controlling a flow of said first material and a second flow control valve actuable by a second valve signal for controlling a flow of said second material, (2) ratio-setting means for securing a chosen ratio between a rate of flow of the first fluid material through the first valve and a rate of flow of the second fluid material through the second valve and thereby obtain a desired blend of material upon mixing the said flows downstream of said valves, and (3) check means for sensing periods of time when one or more of the said supplies is not adequate for obtaining the desired blend and for halting blending until the supplies are adequate.

16. Apparatus for treating a fluid, particulate material as claimed in claim 1 or 15, further including blend data storage means, reading means for obtaining from the storage means information about a chosen blend ratio, and actuating means for setting operating parameters of the apparatus in order to secure production of the chosen blend.

17. Apparatus as claimed in claim 16, wherein the storage means is a set of cards each of which has features of shape or pattern which denote to said reading means a chosen blend ratio.

18. A method of treating a particulate material the constituent particles of which are of non-uniform size in order to obtain at least one product which meets a desired particulate specification, in which use is made of a classifier which separates the particulate material into a relatively coarse underflow fraction and a relatively fine overflow fraction and which has control means for varying as required the flow of the underflow fraction from the classifier comprising the steps of:

(i) providing at least a first and a second one of said classifier, the said first classifier having a first control means for varying as required the flow of a first underflow fraction from the said first classifier and the said second classifier having a second means for varying as required the flow of a second underflow fraction from the second classifier;

(ii) blending the consequent first and second underflow fractions;

(iii) maintaining during said blending step a chosen blend ratio the rate of flow of the first underflow fraction and the rate of flow of the second underflow fraction; and (iv) dumping as and when necessary such underflow fraction as is surplus to blending requirements.

19. A method as claimed in claim 18, wherein the said second classifier is provided downstream of the said first classifier and receives as input the overflow fraction of the said first classifier.

20. A method according to claim 18 or 19, wherein the operating parameters of the said first and second classifiers are so selected that each of the first and second underflow fractions is itself a product which meets a useful, desired particulate specification.

* * * * *